United States Patent
Navarro

(10) Patent No.: US 8,556,006 B1
(45) Date of Patent: Oct. 15, 2013

(54) VEHICLE MAGNETIC DRIVE APPARATUS

(76) Inventor: Louis E. Navarro, East Meadow, NY (US)

( * ) Notice: Subject to any disclaimer, the term of this patent is extended or adjusted under 35 U.S.C. 154(b) by 593 days.

(21) Appl. No.: 12/780,398

(22) Filed: May 14, 2010

Related U.S. Application Data

(60) Provisional application No. 61/180,411, filed on May 21, 2009.

(51) Int. Cl.
*B60K 1/00* (2006.01)

(52) U.S. Cl.
USPC ..................... 180/65.1; 180/65.31

(58) Field of Classification Search
USPC .............. 180/65.1, 65.31; 903/952
See application file for complete search history.

(56) References Cited

U.S. PATENT DOCUMENTS

| | | | | |
|---|---|---|---|---|
| 5,489,001 A | * | 2/1996 | Yang | 180/65.21 |
| 5,632,351 A | * | 5/1997 | Ishiyama | 180/65.1 |
| 5,678,646 A | * | 10/1997 | Fliege | 180/65.1 |
| D386,666 S | | 11/1997 | Hodges | |
| 6,125,803 A | | 10/2000 | Hattori et al. | |
| 6,223,844 B1 | * | 5/2001 | Greenhill et al. | 429/429 |
| 6,541,887 B2 | * | 4/2003 | Kawamura | 310/190 |
| 6,563,246 B1 | * | 5/2003 | Kajiura et al. | 310/162 |
| 6,585,093 B2 | | 7/2003 | Hara et al. | |
| 6,798,104 B2 | * | 9/2004 | Kajiura et al. | 310/162 |
| 6,806,610 B2 | | 10/2004 | Dilliner | |
| 6,830,233 B2 | | 12/2004 | Katsumata et al. | |
| 7,053,742 B2 | | 5/2006 | Lanni et al. | |
| 7,520,353 B2 | * | 4/2009 | Severinsky et al. | 180/65.28 |
| 7,647,994 B1 | * | 1/2010 | Belloso | 180/65.31 |
| 7,753,822 B2 | * | 7/2010 | Weinschenker et al. | 477/3 |
| 8,157,037 B2 | * | 4/2012 | Reed et al. | 180/65.6 |
| 8,207,645 B2 | * | 6/2012 | Ichiyama | 310/191 |
| 2002/0047448 A1 | * | 4/2002 | Kawamura | 310/181 |
| 2002/0070692 A1 | | 6/2002 | Gonzales | |
| 2004/0026143 A1 | * | 2/2004 | Sadarangani | 180/65.4 |
| 2004/0192487 A1 | * | 9/2004 | Teraoka | 475/198 |

* cited by examiner

*Primary Examiner* — Jeffrey J Restifo

(57) ABSTRACT

The vehicle magnetic drive apparatus has a drive shaft selectively coupled to an existing engine and drive train of an existing vehicle, the driveshaft further having an electrical armature material, a cylindrical housing freely surrounding the driveshaft, the housing selectively affixed to the existing vehicle, the housing further having a first closed end spaced apart from a second closed end, a coil freely surrounding the driveshaft, whereby the driveshaft and coil form an electric motor, and a means for engaging and disengaging the electric motor in progressive power output.

5 Claims, 4 Drawing Sheets

VEHICLE MAGNETIC DRIVE APPARATUS

CROSS-REFERENCE TO RELATED APPLICATIONS

U.S. Provisional Patent Application No. 61/180,411 filed May 21, 2009

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

The benefit of hybridization of motor vehicles is now well understood. Various devices and systems have been proposed and produced. Some greatly vary from others. Still, some provide only slight variation from one propulsion means to the next. To date, most such devices and systems, whether similar or dissimilar, share a common problem—extreme complexity and therefore related expense. The present apparatus provides for creating a fuel/electric hybrid vehicle that utilizes basic design and inexpensive production and sale. The apparatus can provide for an initially produced hybridized vehicle or for converting an existing fuel operated vehicle to a fuel/electric propelled vehicle.

FIELD OF THE INVENTION

The vehicle magnetic drive apparatus relates to fuel/electric hybrid vehicles and more especially to a magnetic drive apparatus for selectively propelling a vehicle.

SUMMARY OF THE INVENTION

The general purpose of the vehicle magnetic drive apparatus, described subsequently in greater detail, is to provide a vehicle magnetic drive apparatus which has many novel features that result in an improved vehicle magnetic drive apparatus which is not anticipated, rendered obvious, suggested, or even implied by prior art, either alone or in combination thereof.

To attain this, the vehicle magnetic drive apparatus provides for hybridizing a fuel powered vehicle, whether from production or retrofit, from an existing fuel operated vehicle. The apparatus comprises an electric motor which may be comprised of a driveshaft surrounded by an electrically conductive material. The electrically conductive material may be copper or any other appropriate material. The driveshaft is substituted for a typical driveshaft of the existing vehicle. The housing that surrounds the driveshaft may be externally shaped as needed and may also include more than one surround, such as one of each side of the driveshaft, for example.

The housing is affixed to the vehicle by any means that is appropriate to a given vehicle. The housing contains the coil that surrounds the rotating driveshaft. As various cars are fitted by the apparatus, various sizes, shapes, and electrical motor outputs of the apparatus are provided.

In function, the apparatus provides electric motor propulsion for the vehicle as called upon. The apparatus is best utilized with a battery bank and a high output alternator within the vehicle. A plethora of devices currently exist for determining and selecting between a fuel engine of a vehicle and electrical power. Therefore, there are many means and devices available for determining when the apparatus is used. Use of the apparatus may be engaged in addition to the fuel engine of the vehicle or in replacement thereof. Ideal fuel mileage and conservation are obtained when the apparatus is switched on in constant cruise attitude of the vehicle. An exemplary use might be to engage the apparatus only when cruising upon a fairly flat surface at a sustained speed. In such conditions, the fuel engine of the vehicle may be disengaged as selected. The fuel engine might best be kept to an idle, charging the batteries, but disengaged from the vehicle drive line, the apparatus thereby fully replacing the fuel engine.

Thus has been broadly outlined the more important features of the improved vehicle magnetic drive apparatus so that the detailed description thereof that follows may be better understood and in order that the present contribution to the art may be better appreciated.

An object of the vehicle magnetic drive apparatus is to conserve fossil fuels.

Another object of the vehicle magnetic drive apparatus is to preserve the environment.

A further object of the vehicle magnetic drive apparatus is to provide for inexpensive hybridized vehicle conversion of an existing fuel powered vehicle.

An added object of the vehicle magnetic drive apparatus is to provide for a hybridized production vehicle.

And, an object of the vehicle magnetic drive apparatus is to provide a basic, inexpensive hybridized vehicle.

A further object of the vehicle magnetic drive apparatus is to provide for hybridized conversion of an existing fuel powered vehicle with only the addition of parts, with either minimal or no vehicle alteration required.

Yet another object of the vehicle magnetic drive apparatus is to provide variable magnetic drive.

These together with additional objects, features and advantages of the improved vehicle magnetic drive apparatus will be readily apparent to those of ordinary skill in the art upon reading the following detailed description of presently preferred, but nonetheless illustrative, embodiments of the improved vehicle magnetic drive apparatus when taken in conjunction with the accompanying drawings.

In this respect, before explaining the current embodiments of the improved vehicle magnetic drive apparatus in detail, it is to be understood that the vehicle magnetic drive apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved vehicle magnetic drive apparatus. It is therefore important that the claims be regarded as including such equivalent constructions insofar as they do not depart from the spirit and scope of the vehicle magnetic drive apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 4 thereof, the principles and concepts of the vehicle magnetic drive apparatus generally designated by the reference number 10 will be described.

Figure 1:
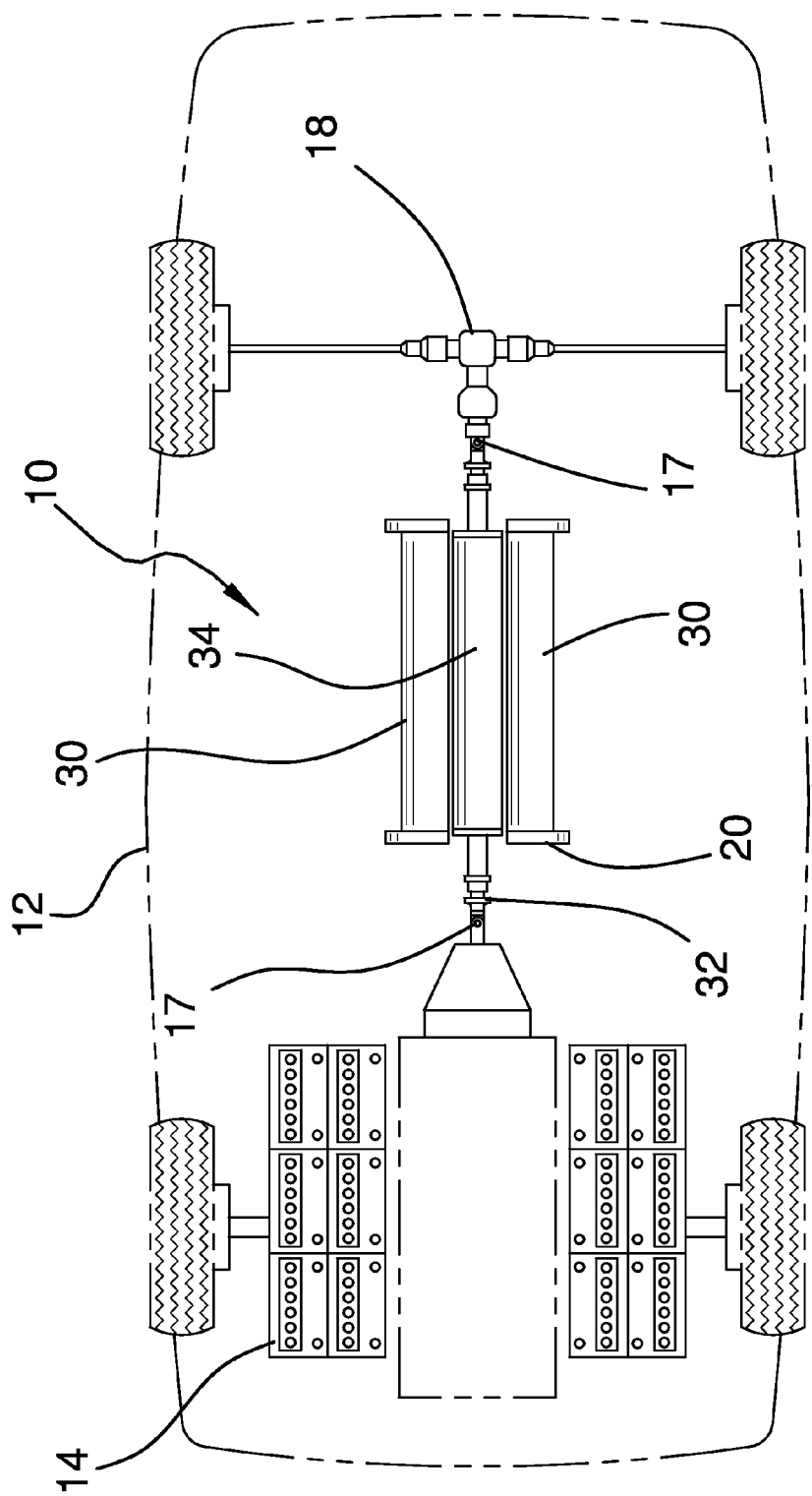
FIG. 1 is a top plan view of the apparatus installed in an existing fuel engine powered vehicle.
Figure 2:
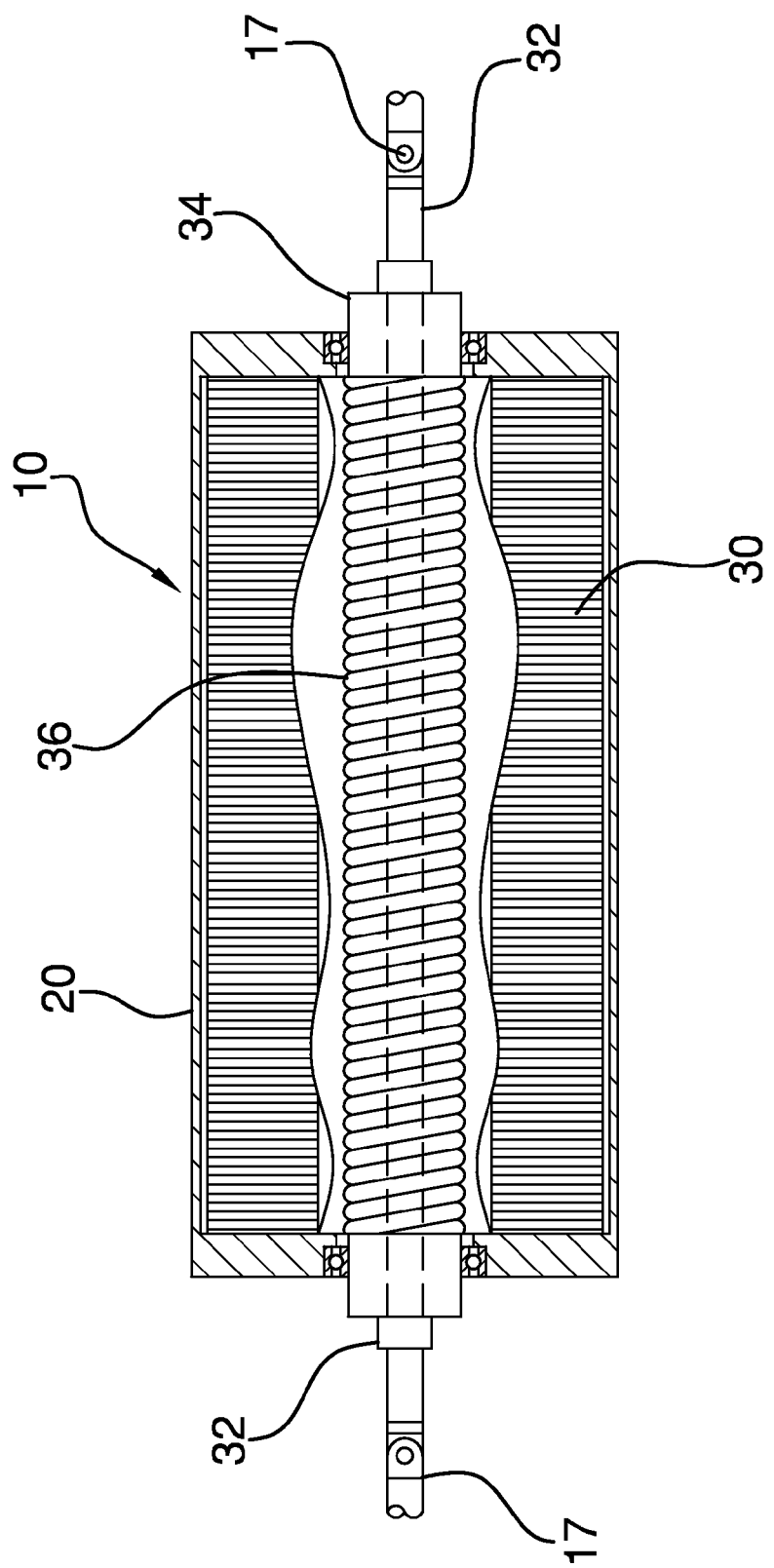
FIG. 2 is a cross sectional view of the apparatus of FIG. 1, taken along the line 2-2.

Referring to FIGS. 1 and 2, the apparatus 10 partially comprises the non-metallic drive shaft 32 selectively coupled to an existing engine 16 and drive train of an existing vehicle 12. In an exemplary application, the driveshaft 32 of the apparatus 10 is coupled to the engine 16 via a driveshaft coupling 17 and to the existing differential 18 via a coupling 17. Couplings 17 may comprise u-joints, constant velocity joints and other such couplings 17 known in the art.

Figure 3:
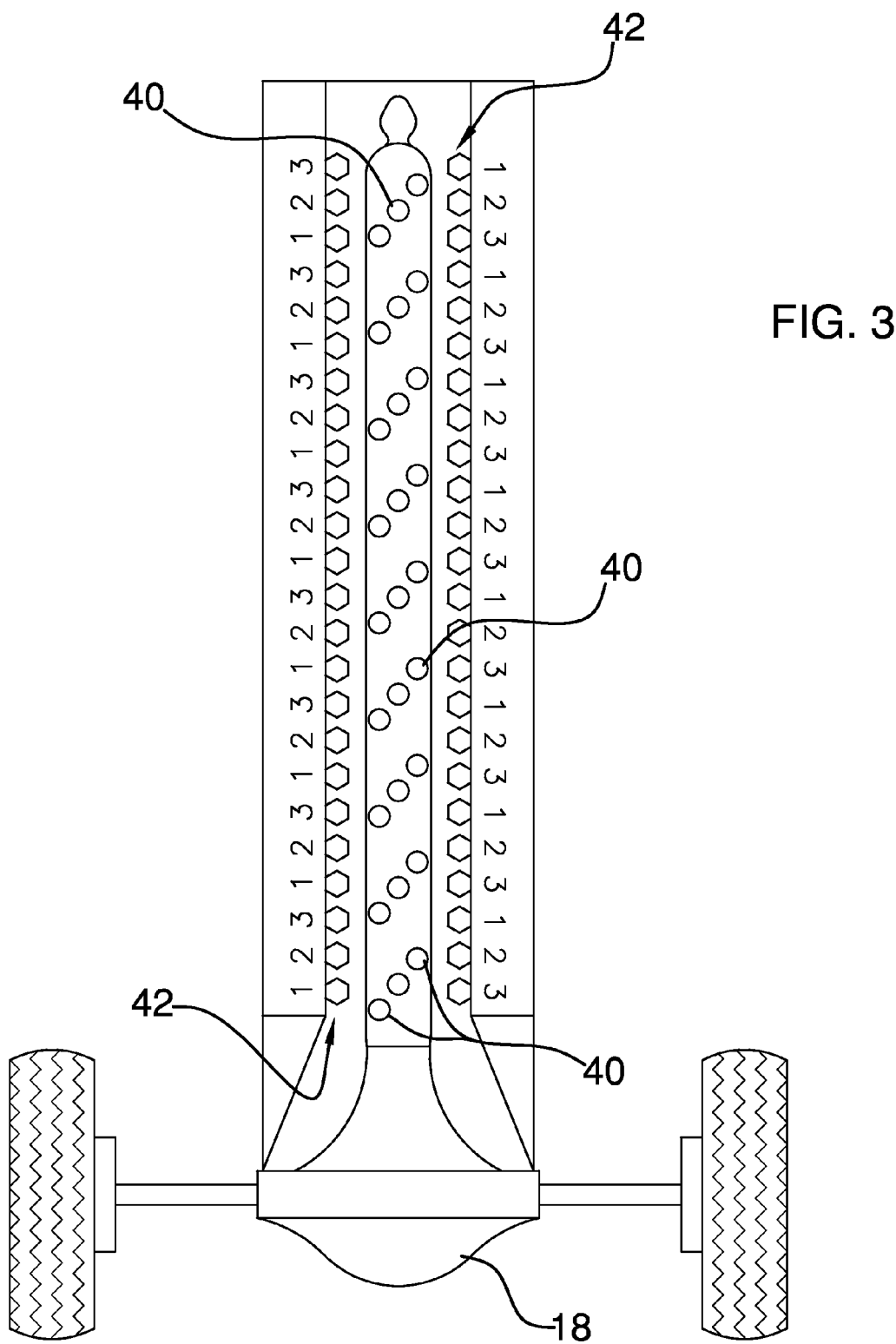
FIG. 3 is a cross sectional view of the apparatus of FIG. 1, taken along the line 3-3.

Referring again to FIG. 2 and also to FIG. 3, the driveshaft 32 further comprises the driveshaft surround 34 encircling the driveshaft 32. The electrically conductive armature material 36 surrounds the driveshaft surround 34. The cylindrical housing 20 freely surrounds the driveshaft 32. The housing 20 further comprises the first closed end 22 spaced apart from the second closed end 24. A seal 26 seals each closed end against the rotateable driveshaft 32 within. Each seal 26 seals against the driveshaft surround 34. The coil 30 freely surrounds the armature material 36 of the driveshaft 32. The driveshaft 32 and coil 30 thereby form an electric motor. The circular cylindrical housing 20 is exemplary only. Housings vary per application and therefore include various shapes.

Referring again to FIG. 1, in operation, the apparatus 10 is engaged and disengaged by way of a driver control. As previously noted, a host and variety of such controls exist in the art. The apparatus 10 is coupled to the existing drive train of the vehicle 12 which partially includes the engine 16, the differential 18 and the driveshaft couplings 17. The coil 30 is energized via electrical connections (not shown) to operate the apparatus 10 as a motor. The coil 30 drives the armature material 36 which surrounds the driveshaft, thereby imparting power to the existing differential 18 of the vehicle 12. Also as previously noted, the controls used can operate the apparatus 10 in the electric motor phase in conjunction with the vehicle 12 engine 16 or instead of the engine 16. The controls can be used to idle the engine 16, thereby continually charging the batteries 14, when the apparatus 10 is propelling the vehicle 12. Or, the apparatus 10 can be used to completely propel a vehicle 12 and drain the batteries 14 without them being charged. Obviously battery capacity determines the range of vehicle 12 operation in such a mode. If the apparatus is used in full conjunction with the vehicle 12 engine 16, additional horsepower is provided for improved acceleration.

Figure 4:
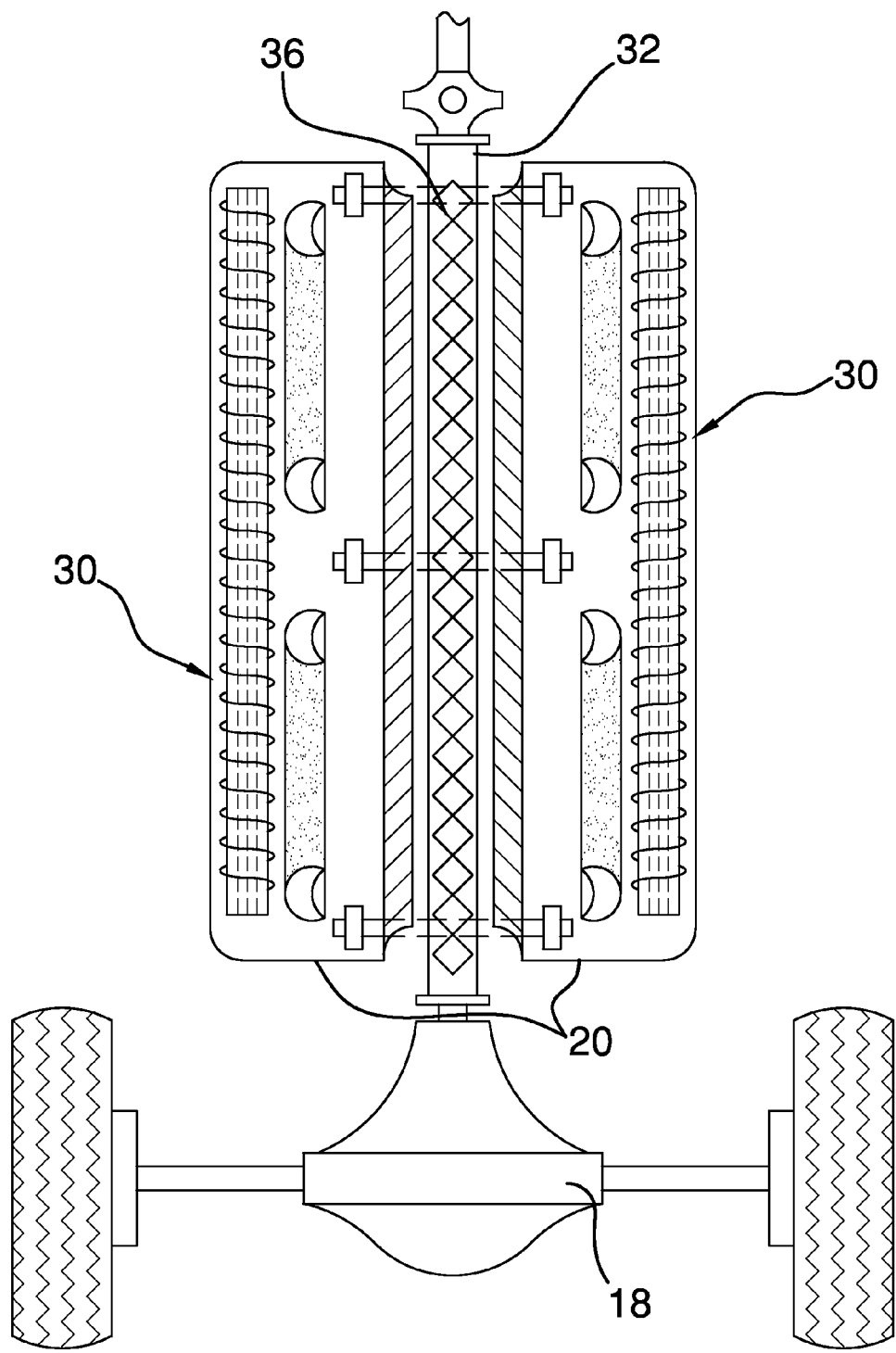
FIG. 4 is an example of the variable magnetic drive provided by staged primary and secondary magnets.

Referring to FIG. 4, staged internally disposed primary magnets 40 and peripherally disposed secondary magnets 42 offer progressive recruitment wherein more magnets are recruited as needed for more powerful drive force, and fewer magnets are recruited in more economical modes.

With respect to the above description then, it is to be realized that the optimum dimensional relationships for the parts of the vehicle magnetic drive apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the vehicle magnetic drive apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the vehicle magnetic drive apparatus may be used.

Therefore, the foregoing is considered as illustrative only of the principles of the vehicle magnetic drive apparatus. Further, since numerous modifications and changes will readily occur to those skilled in the art, it is not desired to limit the vehicle magnetic drive apparatus to the exact construction and operation shown and described, and accordingly, all suitable modifications and equivalents may be resorted to, falling within the scope of the vehicle magnetic drive apparatus.

What is claimed is:

1. A vehicle magnetic drive apparatus comprising, in combination:
   a drive shaft selectively coupled to an existing engine and drive train of an existing vehicle, the driveshaft further comprising an electrical armature material;
   a cylindrical housing freely surrounding the driveshaft, the housing selectively affixed to the existing vehicle, the housing further comprising:
      a first closed end spaced apart from a second closed end;
      a coil freely surrounding the driveshaft;
   whereby the driveshaft and coil form an electric motor;
   a device for engaging and disengaging the electric motor.

2. The apparatus according to claim 1 further comprising a seal sealing each housing closed end against the rotateable driveshaft within.

3. A vehicle magnetic drive apparatus comprising, in combination:
   a non-metallic drive shaft selectively coupled to an existing engine and drive train of an existing vehicle, the driveshaft further comprising:
      a driveshaft surround encircling the driveshaft;
      an electrically conductive armature material surrounding the driveshaft surround;
   a cylindrical housing freely surrounding the driveshaft, the housing selectively affixed to the existing vehicle, the housing further comprising:
      a first closed end spaced apart from a second closed end;
      a coil freely surrounding the armature material of the driveshaft;
   whereby the driveshaft and coil form an electric motor;
   a device for engaging and disengaging the electric motor.

4. The apparatus according to claim 3 further comprising a seal sealing each closed end against the rotateable driveshaft within, each seal sealed against the driveshaft surround.

5. A vehicle magnetic drive apparatus comprising, in combination:
   a non-metallic drive shaft selectively coupled to an existing engine and drive train of an existing vehicle;
   a plurality of primary magnets disposed along the driveshaft the driveshaft further comprising:
      a driveshaft surround disposed in close proximity to the driveshaft, the drive shaft surround further comprising a plurality of secondary magnets;
      an electrically conductive armature material surrounding the driveshaft surround;
   a cylindrical housing freely surrounding the driveshaft, the housing selectively affixed to the existing vehicle, the housing further comprising:
      a first closed end spaced apart from a second closed end;

a coil freely surrounding the armature material of the driveshaft;

whereby the driveshaft and coil form an electric motor;

a device for engaging and disengaging the electric motor;

whereby primary magnets and secondary magnets are progressively recruited in providing variable power output.

\* \* \* \* \*